United States Patent [19]

Witt et al.

[11] Patent Number: 5,290,819
[45] Date of Patent: Mar. 1, 1994

[54] PREPARATION OF BEAD-FORM EXPANDABLE STYRENE pOLYMERS

[75] Inventors: Michael Witt, Ludwigshafen; Manfred Walter, Speyer, both of Fed. Rep. of Germany

[73] Assignee: BASF Aktiengesellschaft, Ludwigshafen, Fed. Rep. of Germany

[21] Appl. No.: 77,432

[22] Filed: Jun. 17, 1993

[30] Foreign Application Priority Data

Jun. 20, 1992 [DE] Fed. Rep. of Germany ....... 4220225

[51] Int. Cl.$^5$ ................................................ C08J 9/20
[52] U.S. Cl. ........................................ 521/56; 521/57; 521/60; 521/146
[58] Field of Search ...................... 521/56, 60, 57, 146

[56] References Cited

U.S. PATENT DOCUMENTS

| | | | |
|---|---|---|---|
| 3,755,282 | 8/1973 | Wright | 260/93.5 W |
| 4,085,169 | 4/1978 | Saito et al. | 521/56 |
| 4,173,688 | 11/1979 | Saito et al. | 521/56 |
| 5,132,330 | 7/1992 | Ueda et al. | 521/56 |

FOREIGN PATENT DOCUMENTS 2510937 9/1976 Fed. Rep. of Germany .

*Primary Examiner*—Morton Foelak
*Attorney, Agent, or Firm*—Keil & Weinkauf

[57] ABSTRACT

Bead-form expandable styrene polymers are obtained by suspension polymerization of styrene with addition of from 1 to 10% by weight of $C_3$- to $C_7$-hydrocarbons and/or carbon dioxide as blowing agent and, if desired, conventional additives, using, as suspension stabilizer, a mixture of magnesium pyrophosphate, a sulfonate group-containing extender and an alkali metal carboxylate or alkaline earth metal carboxylate, the magnesium pyrophosphate being prepared immediately before the polymerization by combining an aqueous solution of alkali metal pyrophosphate with at least the stoichiometrically necessary amount of a magnesium salt.

7 Claims, No Drawings

PREPARATION OF BEAD-FORM EXPANDABLE STYRENE POLYMERS

The present invention relates to a process for the preparation of bead-form expandable styrene polymers (EPS) by polymerizing styrene, in the presence or absence of further comonomers, in aqueous suspension in the presence of a specific suspension stabilizer.

Foams based on styrene polymers have achieved considerable industrial importance as thermal insulation and packaging materials. They are prepared on an industrial scale by first preparing expandable styrene polymers by suspension polymerization of styrene in the presence of a blowing agent, expanding these polymers by heating to give foam particles, and subsequently welding the foam particles in molds to give moldings.

The suspension polymerization here is carried out in the presence of suspension stabilizers and conventional styrene-soluble polymerization catalysts.

The suspension stabilizers used are usually molecular colloids, such as polyvinyl alcohol (PVA) or polyvinylpyrrolidone (PVP), or sparingly soluble salts, such as $Ca_3(PO_4)_2$ (Pickering salts) in combination with an extender, such as dodecyl benzenesulfonate.

For the purposes of the present invention, extenders are taken to mean compounds which increase the ability of sparingly soluble inorganic compounds to stabilize suspensions. The extenders partially hydrophobicize the inorganic Pickering salt, which is hydrophilic per se. This is accomplished in a targeted manner in the surface of the polymerizing styrene droplets.

DE-A 25 10 937 discloses a process for the preparation of expandable polystyrene particles by suspension polymerization of styrene in the presence or absence of other comonomers and in the presence of organic suspension stabilizers, such as polyvinylpyrrolidone, the polymerization being carried out in the presence of from 0.001 to 0.4% by weight, based on the aqueous phase, of phosphates and/or carbonates of calcium and/or magnesium, which are intended to reduce the internal water content of the beads. In one embodiment of the process, magnesium pyrophosphate, for example, is formed from the soluble components during the suspension polymerization.

U.S. Pat. No. 3,755,282 describes the suspension polymerization of vinyl-aromatic monomers in the presence of from 0.2 to 1% by weight, based on the monomer, of a phosphate suspension agent (for example magnesium phosphate) and an $\alpha,\beta$-unsaturated carboxylic acid as the only extender. Examples which may be mentioned of $\alpha,\beta$-unsaturated carboxylic acids include acrylic acid, methacrylic acid, crotonic acid, maleic acid and fumaric acid. Large, virtually spherical beads having a narrow bead size distribution were obtained. If, by contrast, a stabilizer system comprising tricalcium phosphate and sodium dodecylbenzenesulfonate was used, small polymer beads having a broad bead size distribution were obtained.

The use of Pickering salts as suspension stabilizers during the suspension polymerization has the advantage that treatment of the effluent is simple and inexpensive. Thus, it is generally possible to remove the majority of the organic pollutants from the effluent by simple sedimentation processes.

However, use of Pickering salts in a suspension polymerization causes some disadvantages. The suspension polymerization generally proves to be very sensitive to impurities, in particular surface-active substances, with respect to the amount of finely divided polymer formed (emulsion polymer), the mean particle size achieved, the particle size distribution and the stability of the polymerization batch with respect to coagulation.

This means that the suspension polymerization also reacts very sensitively to the amount of extender employed.

However, this also restricts the re-use of unsalable peripheral fractions produced during the preparation of EPS and to the use of recycled material. In particular, the emulsion polymer in the effluent cannot be redissolved in the styrene after separation.

In addition, purely hydrophobic particle surfaces result, so that expandable styrene polymers of this type tend to form considerable electrostatic charges.

During foaming using steam, hydrophobic beads of this type generally have lower expandability than beads produced in the presence of a molecular colloid, for a comparable molecular weight distribution.

It is an object of the present invention to provide a process for the preparation of bead-form expandable styrene polymers which does not have the outlined disadvantages.

We have found that, surprisingly, this object is achieved by using a specific suspension stabilizer system which contains magnesium pyrophosphate.

The present invention accordingly provides a process for the preparation of bead-form, expandable styrene polymers by polymerizing styrene, in the presence or absence of further comonomers, in aqueous suspension in the presence of suspension stabilizers and conventional styrene-soluble polymerization catalysts and with addition of from 1 to 10% by weight of a $C_3$- to $C_7$-hydrocarbon and/or carbon dioxide as blowing agent and, if desired, conventional additives in effective amounts, which comprises using, as suspension stabilizer, a mixture of magnesium pyrophosphate, a sulfonate group-containing extender and an alkali metal or alkaline earth metal carboxylate, the magnesium pyrophosphate being prepared immediately before the polymerization by combining an aqueous solution of an alkali metal pyrophosphate with at least the stoichiometrically necessary amount of a magnesium salt.

For the purposes of the present invention, styrene polymers are polystyrene and copolymers of styrene with other $\alpha,\beta$-olefinically unsaturated compounds containing at least 50 parts by weight of copolymerized styrene. Examples of suitable comonomers in the process according to the invention are therefore $\alpha$-methylstyrene, ring-halogenated styrenes, ring-alkylated styrenes, acrylonitrile, esters of acrylic or methacrylic acid with alcohols having 1 to 8 carbon atoms, N-vinyl compounds, such as vinylcarbazole, or small amounts of compounds containing two polymerizable double bonds, such as butadiene, divinylbenzene or butanediol diacrylate.

The blowing agent employed in the process according to the invention is from 1 to 10% by weight, preferably from 3 to 8% by weight, of a $C_3$- to $C_7$-hydrocarbon (such as propane, butane, isobutane, n-pentane, i-pentane, neopentane and/or hexane) and/or carbon dioxide.

If carbon dioxide is used as the blowing agent or a constituent of the blowing agent, it is advantageous to employ a carbon dioxide absorber, as described in German Patent Application P 41 37 405.3.

The styrene polymers may also contain conventional additions of other substances which provide the expandable products with certain properties. Examples which may be mentioned are flameproofing agents based on organic bromine or chlorine compounds, such as trisdibromopropyl phosphate, hexabromocyclododecane and chlorinated paraffin, and synergists for flameproofing agents, such as dicumyl peroxide and highly sensitive organic peroxides; furthermore antistatics, stabilizers, dyes, lubricants, fillers and substances which have an antiadhesive action during prefoaming, such as zinc stearate, melamine-formaldehyde condensates or silica, and agents for shortening the demolding time during expansion, eg. glycerol esters or hydroxycarboxylic acid esters. Depending on the intended effect, the additives may be homogeneously distributed in the particles or in the form of a surface coating.

Correspondingly, the additives are added during the process according to the invention or subsequently applied to the expandable styrene polymers prepared according to the invention.

The suspension polymerization of styrene is known per se and is described in detail in Kunststoff-Handbuch, Volume V, Polystyrene, Carl Hanser-Verlag, (1969), pages 679 to 688. In general, styrene, if desired together with the abovementioned comonomers, is suspended in water, and organic or inorganic suspension stabilizers are added.

In the process according to the invention, bead-form expandable styrene polymers are prepared by polymerizing styrene, if desired together with up to 50% by weight of the abovementioned comonomers, in aqueous suspension, the above-described blowing agents and, if desired, conventional additives in effective amounts being added before, during or after the polymerization.

The polymerization can also be carried out in the presence of a conventional chain-transfer agent, which regulates the molecular weight. Preference is given to tert-dodecyl mercaptan or DMS (dimeric α-methylstyrene). The regulator is generally used in an amount of from 0.0001 to 0.01% by weight, based on styrene.

An essential feature of the process according to the invention is the use of a mixture of magnesium pyrophosphate, a sulfonate group-containing extender and an alkali metal or alkaline earth metal carboxylate as suspension stabilizer. The results of carrying out the process according to the invention, for example, without carboxylate is reduced stability of the suspension polymerization batch with respect to coagulation. In addition, an increased internal water content in the EPS beads and an impairment of the reactor state due to waxing are observed.

During further processing of the expandable styrene polymers prepared by the process according to the invention, it is found, surprisingly, that omission of the carboxylate generally reduces the throughput during continuous prefoaming by 30% and generally increases the surface resistance of moldings produced therefrom by at least a power of ten.

In the process according to the invention, magnesium pyrophosphate is generally introduced into the reactor at the beginning of the polymerization and is generally employed in a concentration of from 0.03 to 2.0% by weight, preferably from 0.05 to 0.5% by weight, particularly preferably from 0.1 to 0.2% by weight, based on the aqueous phase.

The magnesium pyrophosphate to be employed according to the invention is prepared immediately before the polymerization by combining an aqueous solution of an alkali metal pyrophosphate with at least the stoichiometrically necessary amount of a magnesium salt, which can be in solid form or in aqueous solution.

In a preferred embodiment, the magnesium pyrophosphate is prepared by combining aqueous solutions of sodium pyrophosphate ($Na_4P_2O_7$) and magnesium sulfate ($MgSO_4 \cdot 7H_2O$).

The magnesium pyrophosphate is preferably formed by adding an $MgSO_4 \cdot 7H_2O$ solution to a solution of $Na_4P_2O_7$. The magnesium salt is added in at least the stoichiometrically necessary amounts, preferably in the stoichiometric amount. It is essential for the process according to the invention that there is no excess of alkali metal pyrophosphate.

In a preferred embodiment of the process according to the invention, magnesium pyrophosphate is not prepared in the presence of all the aqueous phase of the subsequent suspension polymerization. The use of less than half the water employed for the suspension polymerization has proven particularly advantageous. For example, a 20% strength by weight $MgSO_4 \cdot 7H_2O$ solution can be added to a 3% strength by weight $Na_4P_2O_7$ solution.

The process according to the invention uses sulfonate group-containing extenders, including, for example, sodium dodecylbenzenesulfonate, long-chain alkylsulfonates, vinyl sulfonate and diisobutyl naphthalenesulfonate.

Preferred extenders are alkali metal salts of dodecylbenzenesulfonic acid and/or alkali metal salts of a mixture of $C_{12}$–$C_{17}$-alkylsulfonic acids. A particularly suitable mixture of $C_{12}$–$C_{17}$-alkylsulfonates comprises sodium alkylsulfonates, predominantly secondary, having a mean chain length of 15 carbon atoms and containing up to 0.2% by weight of organically bound chlorine. A mixture of this type is marketed by Bayer AG under the name Mersolat ® K 30.

The extenders are generally employed in amounts of from 0.5 to 15% by weight, preferably from 2 to 10% by weight, based on magnesium pyrophosphate.

An essential feature of the process according to the invention is the use of an alkali metal carboxylate or alkaline earth metal carboxylate. The carboxylate preferably contains at least one olefinic double bond. Carboxylates which are particularly suitable according to the invention are the alkali metal salts of acrylic acid, methacrylic acid and sorbic acid.

Very particular preference is given to sodium acrylate and potassium acrylate.

The carboxylate is generally employed in an amount of from 0.005 to 0.5% by weight, preferably from 0.01 to 0.1% by weight, particularly preferably from 0.02 to 0.05% by weight, based on the aqueous phase.

The preferred ranges indicated for the concentrations of magnesium pyrophosphate, sulfonate group-containing extender and carboxylate contain slight improvements. However, the particular advantage of the process according to the invention is precisely that the suspension polymerization is relatively insensitive to variations in the concentration of these substances and of impurities.

The process according to the invention is preferably carried out using a baffle.

In a particularly preferred embodiment of the process according to the invention, a mixture of the extender is metered in together with the alkali metal acrylate after certain polymerization times.

By adjusting the metering times, the desired bead diameter d' can be adjusted as desired in broad ranges (for example in the range from 0.5 to 3 mm).

The mean bead diameter d' is determined by the Rosin-Rammler-Sperling-Bennett method as described in DIN 66 145.

A particular advantage of the process according to the invention is that the d, value is affected within broad limits neither by the amount of magnesium pyrophosphate nor by the amount of extender.

The process according to the invention is also particularly suitable when recycled material is used. The opportunities for using characteristic redissolution material can be significantly extended by liquid-liquid extraction of the dissolution material dissolved in styrene with the aid of water. The dissolution material can thus be employed in concentrated solutions (in general up to about 40% by weight of the organic phase).

The blowing agent-containing styrene polymer particles produced according to the invention generally have a diameter of from 0.2 to 4 mm. They can be prefoamed by conventional methods, for example using steam, to give foam particles having a diameter of from 0.1 to 2 cm and a bulk density of from 0.005 to 0.1 g/cm$^3$.

Prefoaming of the particles can then be completed by conventional processes to give foam moldings having a density of from 0.005 to 0.1 g/cm$^3$.

The process according to the invention has numerous advantages. Very stable polymer batches are obtained. The polymer diameter of the expandable, bead-form styrene polymers can be sold readily and precisely. The blowing agent-containing expandable bead polymers have low internal water contents, a high expansion capacity and good and constant processing properties. In addition, the tendency toward electrostatic charging is lower.

It is also possible to employ various organic monomer phases without rebalancing the stabilizer system (for example for flameproofed and non-flameproofed grades).

The emulsion polymer produced in the process according to the invention can be separated off by simple sedimentation methods. Additional biological treatment causes no problems. In addition, work-up of the product does not require acid washing or other inconvenient washing operations.

The particular environmental friendliness of the process according to the invention arises from the fact that the sulfonate group-containing extender can be employed in very small amounts, in contrast to a molecular colloid such as polyvinylpyrrolidone. Compared with the amount of polyvinylpyrrolidone usually employed, it is sufficient to employ the extender in the process according to the invention in an amount of less than a twentieth.

A further advantage is the low stabilizer costs.

In the examples, parts and percentages are by weight.

EXAMPLES 931.8 g of $Na_4P_2O_7$ were dissolved in 32 l of water at room temperature. A solution of 1728 g of $MgSO_4 \cdot 7H_2O$ in 8 l of water was added to this solution with stirring, and the mixture was subsequently stirred for a further 5 minutes.

480 l of water were introduced into a pressure-tight stirred reactor, and the $Mg_2P_2O_7$ suspension was added with stirring. 500 l of styrene together with 1.15 kg of tert-butyl perbenzoate and 0.5 kg of dibenzoyl peroxide were then added. The stirred reactor was sealed, a nitrogen pressure of 1 bar was established, and the mixture was heated to 90° C. over the course of 2 hours and subsequently to 125° C. over the course of 5 hours, and was then kept at 125° C. for 5 hours. 2 hours after a temperature of 80° C. had been reached, 4.7 kg of a 1% strength aqueous solution of Mersolat® K30 were added together with 1.3 kg of a 10% strength aqueous sodium acrylate solution. 170 minutes after a temperature of 80° C. had been reached, 37 kg of pentane were added.

After cooling, the resultant bead polymer was separated off from the aqueous phase, washed and surface-dried, and the internal water content was determined by the Karl Fischer method. The mean bead diameter d' and the distribution width $\beta$ were determined by the Rosin-Rammler-Sperling-Bennett method as described in DIN 66 145.

100 parts of the expandable polystyrene granules containing the bead size fraction with a diameter of from 0.7 to 1.0 mm were coated with 0.4 parts of glycerol monostearate for 4 minutes in a paddle mixer.

A portion of the coated EPS beads was treated with flowing steam for 6 minutes in a Rauscher-type batch prefoamer, and the bulk density was determined.

A further portion of the coated EPS beads was prefoamed to a bulk density of 20 g/l with flowing steam in a Rauscher-type continuous stirred prefoamer, and the throughput (in kg/h) was determined.

After interim storage for 24 hours, the prefoamed beads obtained in the batch prefoamer were foamed to completion to give a rectangular foam molding, and the surface resistance $R_{O4}$ of the latter was determined in accordance with DIN 53 482 at an atmospheric humidity of 50%.

The viscosity (0.5% strength in toluene at 25° C.) was determined in accordance with DIN 53 726.

COMPARATIVE EXAMPLE

The procedure was as in the Example, but without addition of sodium acrylate.

The results obtained for the Example and the Comparative Example are summarized in the Table.

TABLE

|  | Example | Comparative Example |
| --- | --- | --- |
| Mean bead diameter d' [mm] | 0.86 | 0.92 |
| Distribution width $\beta$ | 17.1 | 17.4 |
| Viscosity | 75.2 | 76.0 |
| Internal water content (0.7–1 mm) [% by wt.] | 0.38 | 0.89 |
| Pentane content [% by wt.] | 6.08 | 6.10 |
| Bulk density after 6 min [g/l] | 12.2 | 15.6 |
| Throughput [kg/h] | 227 | 169 |
| Surface resistance $R_{O4}$ [$\Omega$] | $<10^{11}$ | $>10^{12}$ |

We claim:

1. A process for the preparation of bead-form, expandable styrene polymers by polymerizing styrene, in the presence or absence of further comonomers, in aqueous suspension in the presence of suspension stabilizers and conventional styrene-soluble polymerization catalysts and with addition of from 1 to 10% by weight of a $C_3$- to $C_7$-hydrocarbon and/or carbon dioxide as blowing agent and, optionally, conventional additives in effective amounts, which comprises using, as suspension stabilizer, a mixture of magnesium pyrophosphate, a sulfonate group-containing extender and an alkali metal or alkaline earth metal carboxylate, the magnesium pyrophosphate being prepared immediately before the polymerization by combining an aqueous solution of an alkali metal pyrophosphate with at least the stoichiometrically necessary amount of a magnesium salt.

2. A process as claimed in claim 1, wherein magnesium pyrophosphate is employed in a concentration of from 0.03 to 2.0% by weight, based on the aqueous phase.

3. A process as claimed in claim 1, wherein the extender employed is an alkali metal salt of a mixture of $C_{12}$-$C_{17}$-alkylsulfonic acids.

4. A process as claimed in claim 1, wherein the extender employed is an alkali metal salt of dodecylbenzenesulfonic acid.

5. A process as claimed in claim 1, wherein a carboxylate containing at least one olefinic double bond is employed.

6. A process as claimed in claim 5, wherein an acrylate is employed.

7. A process as claimed in claim 1, wherein the alkali metal pyrophosphate used is $Na_4P_2O_7$ and the magnesium salt used is $MgSO_4 \cdot 7H_2O$.

* * * * *

UNITED STATES PATENT AND TRADEMARK OFFICE
CERTIFICATE OF CORRECTION

PATENT NO.: 5,290,819

DATED: March 1, 1994

INVENTOR(S): WITT et al.

It is certified that error appears in the above-identified patent and that said Letters Patent is hereby corrected as shown below:

On the title page, item [54], "pOLYMERS" should be --POLYMERS--.

Signed and Sealed this

Twenty-seventh Day of September, 1994

Attest:

BRUCE LEHMAN

*Attesting Officer*  *Commissioner of Patents and Trademarks*